G. AMBORN.
THREADING AND OTHER TOOL.
APPLICATION FILED MAR. 20, 1912.
1,171,164.
Patented Feb. 8, 1916.
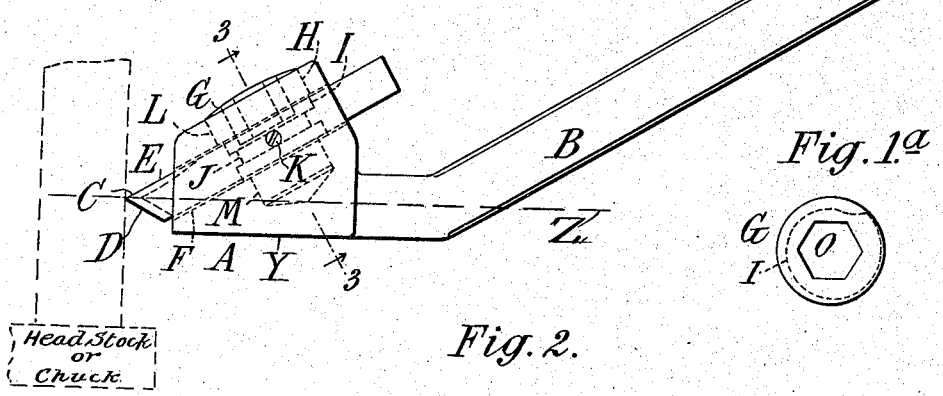
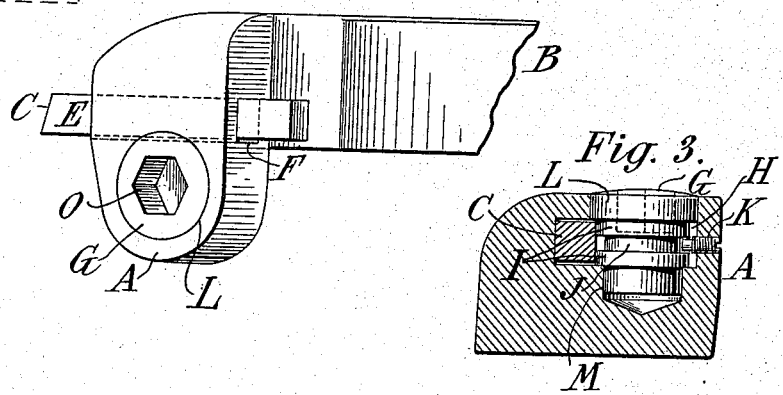
WITNESSES:
Rene Bruine
Fred White
INVENTOR:
George Amborn,
By Attorneys,
Fraser, Buck & Myers

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

THREADING AND OTHER TOOL.

1,171,164.     Specification of Letters Patent.    Patented Feb. 8, 1916.

Application filed March 20, 1912. Serial No. 684,980.

*To all whom it may concern:*

Be it known that I, GEORGE AMBORN, a citizen of the United States, residing in Chapinville, in the county of Litchfield and State of Connecticut, have invented certain new and useful Improvements in Threading and other Tools, of which the following is a specification.

This invention relates to threading and other tools and aims to provide certain improvements therein.

The invention is particularly directed to a threading tool and means for holding it or operating it, the object being to simplify the construction of tool and holder. To this end in the preferred form of my invention I provide a threading tool in the form of a plane bar cutter which preferably has its working edge inclined to less than a right angle, and means for holding the cutter in such position with regard to the work to be threaded that a plane perpendicular to the longitudinal axis of the work will bisect the angle formed by the two cutting edges of the cutter.

The invention also includes certain other features of improvement which will be hereinafter more fully pointed out.

Referring to the drawings which illustrate the invention, Figure 1 is a top view of the invention. Fig. 1ª is a detail view, in side elevation, of the fastening cam. Fig. 2 is a side view of Fig. 1. Fig. 3 is a section taken on the line 3—3 in Fig. 1.

Referring first to Figs. 1 to 3, let A indicate the head of the tool holder, and B its shank, the latter being extended at an angle. C indicates a threading tool which is shown as comprising a bar of square or other rectangular cross-section, such cutter being formed at its end with a face which is disposed angularly to one of the sides of the cutter in such relation thereto as to correspond to the angle between the threads to be cut. In ordinary thread work this angle is about 60°, and I have hence shown the cutting edge D on the ends of the cutter disposed at a corresponding angle viz. 60° to the cutting edge E on the side of the cutter.

If such a cutter were presented to the work with its longitudinal axis perpendicular to the work, it is obvious that the sides of the thread would not correspond in their pitch. Heretofore it has been usual to form the end of the cutter with a beveled working face but this necessitates the sharpening of two faces when the cutter is dull. By the present invention the cutter of the form described which requires only the sharpening of a single face may be utilized by the provision of a suitable means for supporting it at such angle to the work that the sides of the thread have an equal slope, or in other words at such angle that a perpendicular line from the work intersecting the end of the cutter would divide the latter into two equal angles. In the construction shown the head A is formed with a cutter holding slot F which extends at the proper angle to the axis Z of the holder, the axis Z being the axis of the tool holder which is perpendicular to the work when the holder is in working position in a lathe, which axis will be hereinafter referred to as the "longitudinal axis" of the holder. The axis Z of the holder will bisect the angle formed between the edges D and E of the cutter. Suitable means are provided for holding the cutter in the slot. This slot F is preferably formed parallel with the shank B of the holder and the head A of the holder is also preferably provided with a face Y parallel to the axis Z of the holder. The face Y is of utility in setting the tool-holder in the lathe, the face Y presenting a flat surface to an implement which may be used in setting the tool-holder with relation to the work.

The clamping means for holding the tool may be of any desirable construction, but my invention provides a means for this purpose which are especially adapted for this class of tool. This means comprises essentially a cam member G which is preferably adapted to fit in a socket H formed in the head A of the tool immediately above the cutter C. The cam member is formed with a cam face I which is in the general shape of a spiral and which presses down upon the tool as the cam is rotated. In the construction shown in Figs. 1 to 3 a groove J is provided in the cam face which is adapted to receive a small screw pin K whereby to hold the cam in position within the holder. The cam is also provided with a bearing face L on its outer side and a similar bearing face M on its inner side, which bearing faces serve to transmit the strain to the walls of the head of the holder when the cam is brought into engagement with the tool. The cam is provided with some means whereby it may be turned, such as the wrench socket O. By this construction the tool may be very firmly fixed in position by a very quick movement of the cam, and when so fixed it exerts no substantial tendency to loosen in use. Moreover, the clamping action is not dependent upon any threads or other parts liable to be broken. If by any possibility the cam is injured, it can be easily removed without the necessity of drilling it or boring it out.

While I have shown and described several embodiments of the invention, it will be understood that I do not wish to be limited thereto, as changes may be made therein within the scope of the claims without departing from the invention.

What I claim is:—

1. A thread-cutting tool comprising a bar-shaped cutter and a tool holder, said cutter having a straight edge lengthwise thereof adapted to form a continuous straight cutting edge, and a second cutting edge at an angle to said lengthwise edge, said lengthwise edge being adapted to have successive portions thereof brought into use by successive grindings of said second angularly-disposed edge, said tool holder being adapted to hold said cutter at such an angle to the work that a perpendicular to the work bisects the angle formed by the two aforesaid cutting edges of the cutter, whereby an equilateral groove may be cut.

2. A thread-cutting tool comprising a bar-shaped cutter and a tool-holder, said cutter having a straight edge lengthwise thereof adapted to form a continuous straight cutting edge and a second cutting edge at an angle to said lengthwise edge, said lengthwise edge being adapted to have successive portions thereof brought into use by successive grindings of said second angularly disposed edge, said tool-holder being adapted to hold said cutter at such an angle that the longitudinal axis Z of the holder bisects the angle formed by the two aforesaid cutting edges of the cutter, said tool-holder having a shank on the cutter side thereof at an angle to said longitudinal axis.

3. A thread-cutting tool comprising a bar-shaped cutter and a tool-holder, said cutter having a straight edge lengthwise thereof adapted to form a continuous straight cutting edge and a second cutting edge at an angle to said lengthwise edge, said lengthwise edge being adapted to have successive portions thereof brought into use by successive grindings of said second angularly-disposed edge, said tool-holder being adapted to hold said cutter at such an angle that the longitudinal axis Z of the holder bisects the angle formed by the two aforesaid cutting edges of the cutter, said tool-holder having a shank on the cutter side thereof substantially parallel to said lengthwise edge of the cutter.

4. A tool holder for thread-cutters, comprising a shank and a fixed head having a tool recess therein, said tool recess being angularly disposed with relation to the longitudinal axis Z of the holder, said shank being disposed substantially parallel to said tool recess on the side opposite the cutter side of the tool.

5. A tool holder for thread cutters comprising a shank and a fixed head having a tool recess therein, said tool recess being angularly disposed with relation to the longitudinal axis Z of the holder, said shank being disposed substantially parallel to said tool recess, said tool holder also having a face Y at an angle to said tool recess and adapted to present a flat face to an implement used in setting the tool holder with relation to the work.

6. A tool holder for thread cutters comprising a shank and a fixed head having a tool recess therein, said tool recess being angularly disposed with relation to the longitudinal axis Z of the holder, said shank being disposed substantially parallel to said tool recess, said tool holder having means for clamping a cutter in said recess, said means being operable from the side of the holder opposite the shank.

7. A thread cutting tool comprising a bar-shaped cutter and a tool holder, said cutter having a straight edge lengthwise thereof adapted to form a continuous straight cutting edge, and a second cutting edge at an angle to said lengthwise edge, said lengthwise edge being adapted to have successive portions thereof brought into use by successive grindings of said second angularly-disposed edge, said tool holder having a front face substantially perpendicular to a line which bisects the angle formed between said cutting edges of the cutter.

8. A thread cutting tool comprising a bar-shaped cutter and a tool holder, said cutter having a straight edge lengthwise thereof adapted to form a continuous straight cutting edge, and a second cutting edge at an angle to said lengthwise edge, said lengthwise edge being adapted to have successive portions thereof brought into use by successive grindings of said second angularly-disposed edge, said tool holder having a front face substantially perpendicular to a line which bisects the angle formed between said cutting edges of the cutter, and a shank angularly inclined with relation to said bisector on the cutter side of the holder.

In witness whereof, I have hereunto signed my name in the presence of two subscribing witnesses.

GEORGE AMBORN.

Witnesses:
CHARLES B. HARRIS,
WILLIAM G. COLE.

Copies of this patent may be obtained for five cents each, by addressing the "Commissioner of Patents, Washington, D. C."